United States Patent [19]

Reyes

[11] Patent Number: 4,498,014

[45] Date of Patent: Feb. 5, 1985

[54] ELECTRIC GENERATING SYSTEM

[76] Inventor: Daniel Reyes, 233 Broadway, Room 3615, Brooklyn, Nebr.W YORK 10007

[21] Appl. No.: 460,675

[22] Filed: Mar. 29, 1983

[51] Int. Cl.³ .............................................. F01D 15/10
[52] U.S. Cl. ...................................... 290/4; 290/1 R; 290/1 A; 290/4 A; 290/4 R
[58] Field of Search ............ 290/1 R, 1 A, 1 B, 1 C, 290/1 D, 1 E, 4 R, 4 A, 4 B, 4 C, 4 D, 45, 52; 74/378, 417, 423, 385; 310/83, 112

[56] References Cited

U.S. PATENT DOCUMENTS

| 2,463,349 | 3/1949 | Baner | 310/112 |
|---|---|---|---|
| 2,539,862 | 1/1951 | Rushing | 290/4 D |
| 2,832,234 | 4/1958 | Sinclair | 74/378 X |
| 3,315,085 | 4/1967 | Mileti et al. | 290/4 R |
| 4,208,592 | 6/1980 | Leibow et al. | 290/52 |
| 4,228,656 | 10/1980 | MacGlashan, Jr. | 74/417 X |
| 4,233,858 | 11/1980 | Rowlett | 290/45 X |
| 4,282,443 | 8/1981 | Seidl | 290/1 R |

Primary Examiner—J. V. Truhe
Assistant Examiner—Paul S. L. Ip

[57] ABSTRACT

An electric generating system is provided and consists of an external power source, an expansion engine connected to the power source, a large generator electrically connected to output of the expansion engine, a housing having a well, a pair of bearings mounted to side walls of the well, a motor having a drive shaft, the motor mounted vertically at bottom of the well, electrically connected to output of the generator with the drive shaft rotatably mounted in the bearings having an end extending therefrom, a large bevel gear driven by the drive shaft of the motor, a plurality of small bevel gears, each small bevel gear radially aligned and driven by the large bevel gear and a plurality of small generators, each small generator having a driven shaft affixed to a small bevel gear and mounted to the housing around the well to produce 100 percent output of electrical power.

3 Claims, 4 Drawing Figures

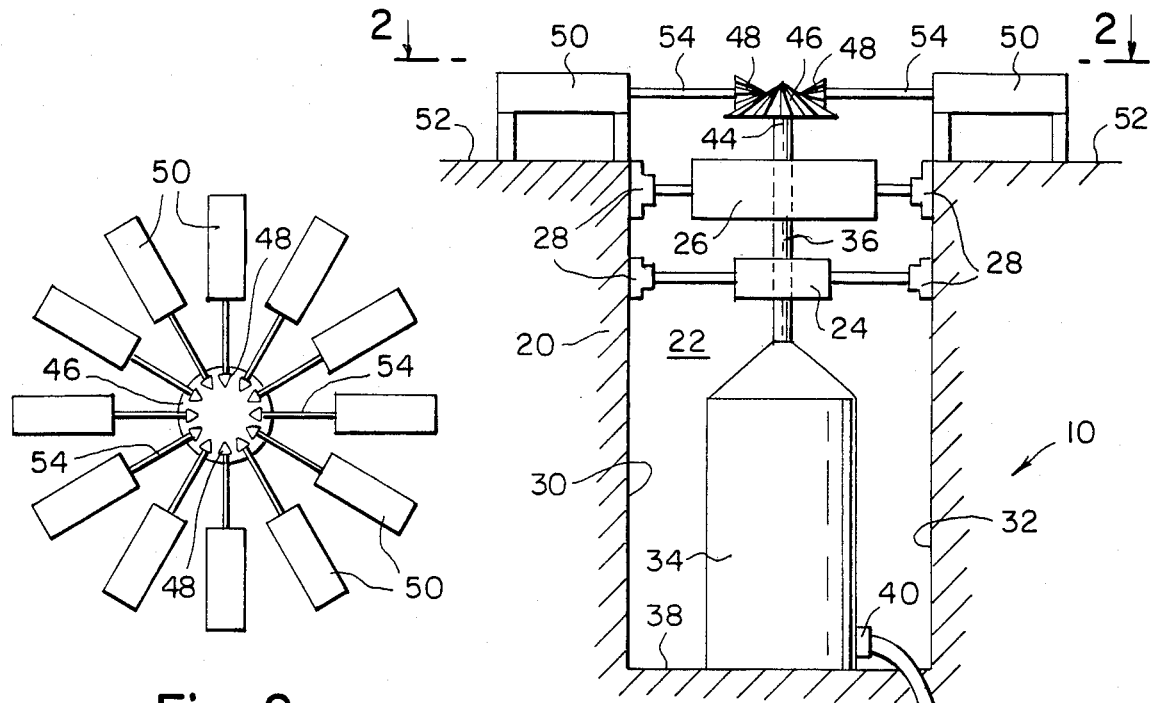
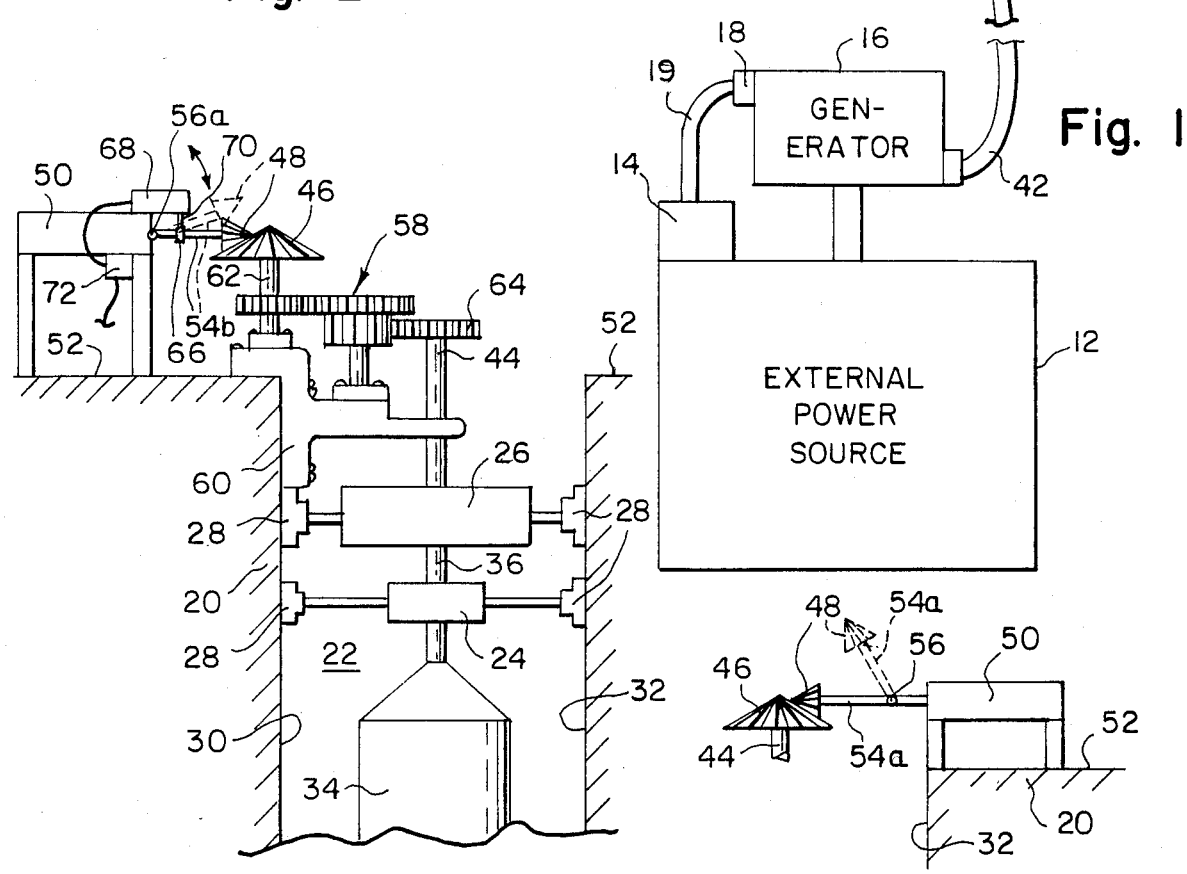
Fig. 2
Fig. 4
Fig. 1
Fig. 3

ELECTRIC GENERATING SYSTEM

BACKGROUND OF THE INVENTION

The instant invention relates generally to generators and more specifically it relates to an electric generating system.

SUMMARY OF THE INVENTION

A principle object of the present invention is to provide an electric generating system that has a motor that drives a plurality of generators to produce a distributed output of electric power from each generator.

Another object is to provide an electric generating system that can utilize an external power source to supply the system.

An additional object is to provide an electric generating system whereby part of the system can be shut down while the other part is still operating.

A further object is to provide an electric generating system that is simple and easy to use.

A still further object is to provide an electric generating system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic view partially in section of the invention;

FIG. 2 is a top view taken along line 2—2 in FIG. 1.

FIG. 3 is a partial sectional view of a modification of a small generator.

FIG. 4 is a partial sectional view of another modification of the invention.

DETAILED DESCRIPTION OF THE PREFERRED EMBODIMENTS

Turning now descriptively to the drawings, in which similar reference characters denote similar elements throughout the several views, FIG. 1 illustrates an electric generating system 10. The system 10 consists of an external power source 12. The power source 12 is a small nuclear reactor. An oil or coal burner can be used in place of the small nuclear reactor. An expansion engine 14 is connected to the power source 12 and a large generator 16 is electrically connected at 18 to output cable 19 of the expansion engine 14.

A housing 20 is provided and has a well 22 with a pair of bearings 24 and 26, mounted with brackets 28 to side walls 30 and 32 of the well 22.

A motor 34 having a drive shaft 36, is mounted vertically at bottom 38 of the well 22 and is electrically connected by cable 40 to output 42 of the generator 16. The drive shaft 36 is rotatably mounted in the bearings 24 and 26 and has an end 44 extending therefrom. A large bevel gear 46 is attached to the end 44 and is driven by the drive shaft 36 of the motor 34.

A plurality of small bevel gears 48 are each radial aligned and driven by the large bevel gear 46. A plurality of small generators 50 are mounted to top 52 of the housing 20 around the well 22. Each of the small generators 50 has a driven shaft 54 affixed to a small bevel gear 48 to produce 100 percent output of electrical power. FIG. 2 best shows the radial arrangement of the small bevel gears 48. Twelve generators 50 are used for illustrative purposes only. Any number of generators 50 can be used in the electric generating system 10.

In FIG. 3 a modification in the small generator 50 shows a driven shaft 54a that is pivotable at 56. The driven shaft 54a can go to an up position, shown in dotted, ;to disengage the small bevel gear 48 from the large bevel gear 46 making the small generator 50 inoperative when needed.

In FIG. 4 another modification is shown. A spur gear differential 58 is mounted at 60 to the housing 20 with the large bevel gear 46 connected to output shaft 62 of the spur gear differential 58. A spur gear 64 is connected to the end 44 of the drive shaft 36 of the motor 34. The spur gear 64 engages the spur gear differential 58 so that the bevel gear 46 is driven by the drive shaft 36 via the spur gear differential 58.

The small generator 50 has a driven shaft 54b that is pivotable at 56a. A sleeve 66 is rotatably mounted to the pivotably driven shaft 54b and a solenoid 68 is affixed to the side of the small generator 50. The solenoid 68 has an arm 70 that is connected to the sleeve 66. A sensor 72 is electrically connected to the solenoid 68 to activate the solenoid 68 so that the arm 70 will pull up the sleeve 66 lifting the pivotably driven shaft 54b, shown in dotted, to disengage the small bevel gear 48.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electric generating system which comprises:
   (a) an external power source;
   (b) an expansion engine connected to the power source;
   (c) a large generator electrically connected to output of the expansion engine;
   (d) a housing having a well;
   (e) a pair of bearings mounted to side walls of the well;
   (f) a motor having a drive shaft, the motor mounted vertically at bottom of the well, electrically connected to output of the generator with the drive shaft rotatably mounted in the bearings having an end extending therefrom;
   (g) a large bevel gear driven by the drive shaft of the motor;
   (h) a plurality of small bevel gears, each small bevel gear radially aligned and driven by the large bevel gear; and
   (i) a plurality of small generators, each small generator having a driven shaft affixed to a small bevel gear and mounted to the housing around the well to produce a distributed output of electrical power from such generator wherein each of the driven shafts of the small generators is pivotable so that each driven shaft can go to an up position to disengage the small bevel gear from the large bevel gear making each of the small generators inoperative when needed.

2. A system as in claim 1; wherein each of the pivotable driven shafts of the small generators further comprises:
- (a) a sleeve rotatably mounted to the pivotable driven shaft;
- (b) a solenoid affixed to side of the small generator, the solenoid having an arm that is connected to the sleeve; and
- (c) a sensor electrically connected to the solenoid to activate the solenoid so that the arm will pull up the sleeve lifting the pivotably driven shaft to disengage the small bevel gear.

3. An electric generating system as recited in claim 2 further comprising,
- (a) a spur gear differential mounted to the housing with the large bevel gear connected to output shaft of the spur gear differential; and
- (b) a spur gear connected to the end of the drive shaft of the motor, the spur gear engaging the spur gear differential so that the large bevel gear is driven by the drive shaft via the spur gear differential.

\* \* \* \* \*